United States Patent

Bahn

Patent Number: 5,691,638
Date of Patent: Nov. 25, 1997

[54] APPARATUS FOR OBTAINING 3-PHASE POSITION DETECTING SIGNALS BY USING A SINGLE POSITION DETECTING ELEMENT

[75] Inventor: Itsuki Bahn, Nerima-ku, Japan

[73] Assignee: Kabushikigaisha Sekogiken, Tokyo, Japan

[21] Appl. No.: 507,281

[22] PCT Filed: Jan. 24, 1995

[86] PCT No.: PCT/JP95/00077

§ 371 Date: Aug. 30, 1995

§ 102(e) Date: Aug. 30, 1995

[87] PCT Pub. No.: WO95/22851

PCT Pub. Date: Aug. 24, 1995

[30] Foreign Application Priority Data

Feb. 22, 1994 [JP] Japan .................. 6-061929

[51] Int. Cl.$^6$ .................. G01B 7/30; H02P 6/16; H02P 7/00; H02P 6/02
[52] U.S. Cl. .................. 324/207.25; 324/207.22; 318/653
[58] Field of Search .................. 324/165, 173, 324/174, 207.22, 207.24, 207.25; 341/11, 13, 15; 318/254, 653, 799

[56] References Cited

U.S. PATENT DOCUMENTS

| 4,142,153 | 2/1979 | Smith | 324/165 |
| 4,774,494 | 9/1988 | Extance | 341/11 |

FOREIGN PATENT DOCUMENTS

| 163328 | 4/1985 | European Pat. Off. . |
| 422226 | 4/1991 | European Pat. Off. . |
| 50-136607 | 10/1975 | Japan . |
| 58-279 | 1/1983 | Japan . |

Primary Examiner—Walter E. Snow
Attorney, Agent, or Firm—Staas & Halsey

[57] ABSTRACT

At the periphery of a rotating disk (15) rotating in synchronization with an electric motor, first, second, and third sections (11a, 12a, ...) with different physical properties are disposed in sequence. Each of these first, second, and third sections has a width of an electrical angle of 120 degrees. One position detecting element (10) fixed to the motor body faces the first, second, and third sections, and as each section passes the element, a 3-phase position detecting signal corresponding to the section is obtained.

3 Claims, 6 Drawing Sheets

5,691,638

APPARATUS FOR OBTAINING 3-PHASE POSITION DETECTING SIGNALS BY USING A SINGLE POSITION DETECTING ELEMENT

TECHNICAL FIELD

The present invention relates to an apparatus for obtaining 3-phase position detecting signals by using a single position detecting element, the apparatus being used as a position detecting apparatus for reluctance type motors, brushless DC motors, or the like.

BACKGROUND ART

A position detecting apparatus for obtaining position detecting signals to detect the position of the rotor of a 3-phase DC motor to control the motor usually requires three position detecting elements. This presents a problem in that the number of electrical parts increases, and the electric circuit is complicated accordingly. This problem is especially remarkable for a small-size motor with a diameter of about 20 mm.

The control of an electric motor by means of a position detecting apparatus using a single position detecting element has been known as disclosed in Unexamined Japanese Patent Publication No. S51-31816. However, the position detecting apparatus of this type poses a problem in that the output torque is unstable when the motor is started.

DISCLOSURE OF THE INVENTION

An object of the present invention relates to a position detecting apparatus for obtaining position detecting signals for controlling an electric motor, and is more particularly to provide a position detecting apparatus which can be applied effectively to a small motor with a small diameter for simplicity of construction, and can generate position detecting signals so that the electric motor can be started and controlled stably.

To achieve the above object, one mode of the present invention comprises a conductor disk rotating in synchronization with the electric motor; a plurality of protrusions each having a width of an electrical angle of 240 degrees, disposed on the circumferential surface of the disk apart from each other by an electrical angle of 120 degrees; a coil constituting a position detecting element which is fixed to the motor body and the coil face of which confronts the rotating surfaces of the protrusions via a slight clearance; means for making the impedance of the coil different by making the clearance between the coil face and a section having a width of 120 degrees electrical angle on the rotating surface of the protrusion different from the clearance between the coil surface and the next section having a width of 120 degrees electrical angle; and an electric circuit for obtaining position detecting signals of first, second, and third phases corresponding to the first, second, and third sections respectively by detecting the difference in impedance among the first section with a width of an electrical angle of 120 degrees, the second section with a width of an electrical angle of 120 degrees, and the third section with a width of an electrical angle of 120 degrees without protrusion, as they pass the coil face, by detecting the change in current value of high-frequency alternate current applied to the coil.

Another mode of the present invention comprises a disk rotating in synchronization with an electric motor; a magnet rotor in which magnets of N and S poles with a width of an electrical angle of 120 degrees are adjacently disposed apart from each other by an electrical angle of 120 degrees on the circumferential surface of the disk; one Hall element consisting of a position detecting element fixed to the motor body and facing the N and S magnetic pole face of the magnet rotor via a slight clearance; and an electric circuit for obtaining position detecting signals of first, second, and third phases without a gap between the adjacent electric signal curves of three electric signals corresponding to first, second, and third sections by detecting first, second, and third output signals of the Hall element when the third section with a width of an electrical angle of 120 degrees without magnetic pole of the magnet rotor passes the Hall element.

According to the present invention, as described above, the first, second, and third sections varying in physical property are disposed at the periphery of the disk rotating in synchronization with the electric motor, each section having a width of an electrical angle of 120 degrees. When the first, second, and third sections pass one position detecting element fixed to the motor body, the corresponding first, second, and third position detecting signals are obtained. Using these signals, the energization of the armature coil of the corresponding first, second, and third phase can be controlled, to rotate the armature.

BEST MODE FOR CARRYING OUT THE INVENTION

A position detecting apparatus used for a reluctance type electric motor of 3-phase half wave will be described as an embodiment of the present invention. Hereinafter, all the angles are referred to as being electrical angles.

Figure 1:
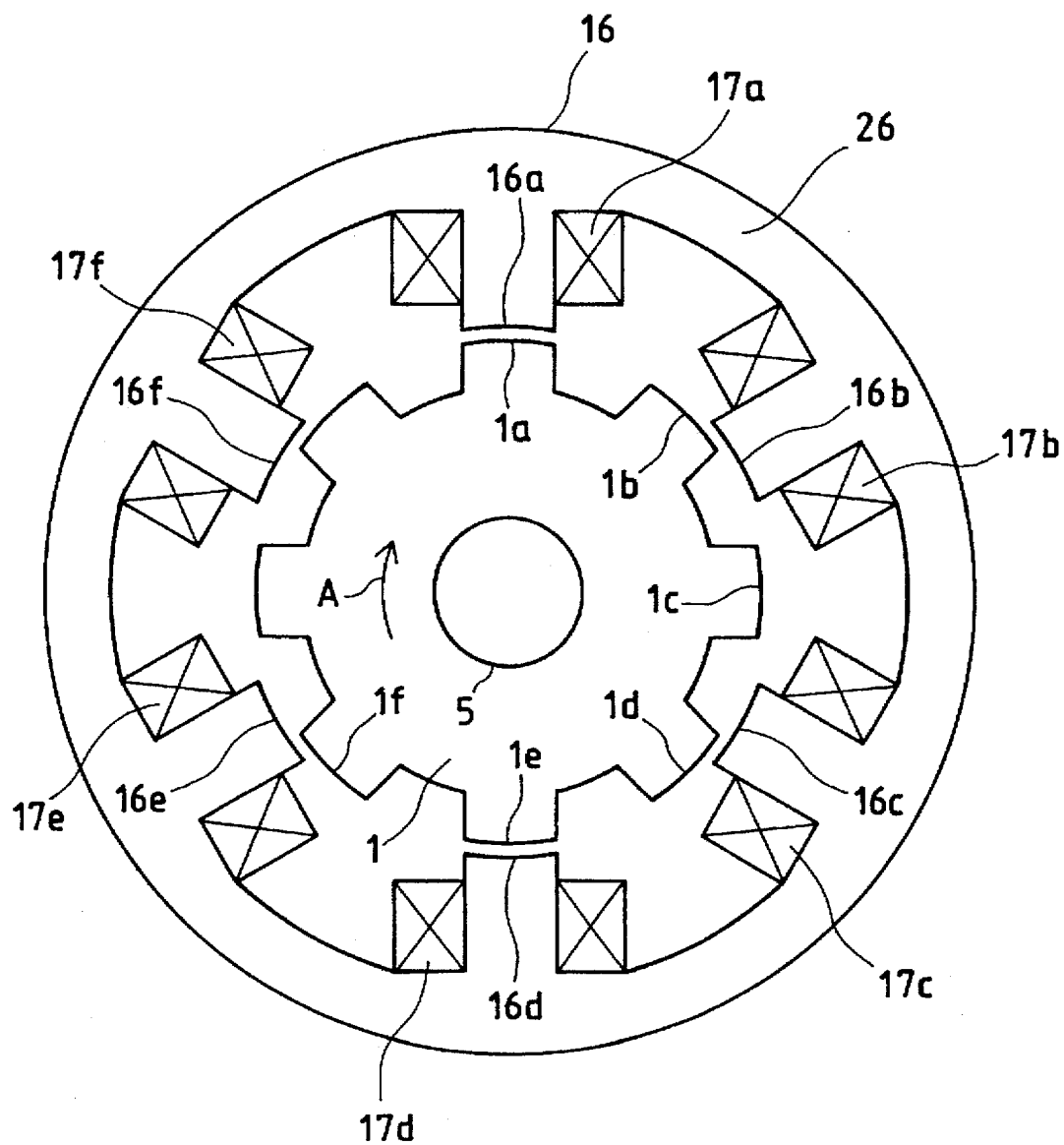
FIG. 1 is a plan view of an armature and a rotor of a reluctance type electric motor.

FIG. 1 is a plan view of a fixed armature and a rotor of a reluctance type electric motor of 3-phase one-sided wave. In FIG. 1, reference numeral 1 denotes a rotor. The width of each of the salient pole 1a, 1b, 1c, . . . of the rotor is 180 degrees. Eight salient poles are disposed in the circumferential direction at equal intervals with a phase difference of 360 degrees. The rotor 1 is formed by the known means using laminated silicon steel plates. Reference numeral 5 denotes a rotating shaft rotating in synchronization with the rotor 1.

Figure 4:
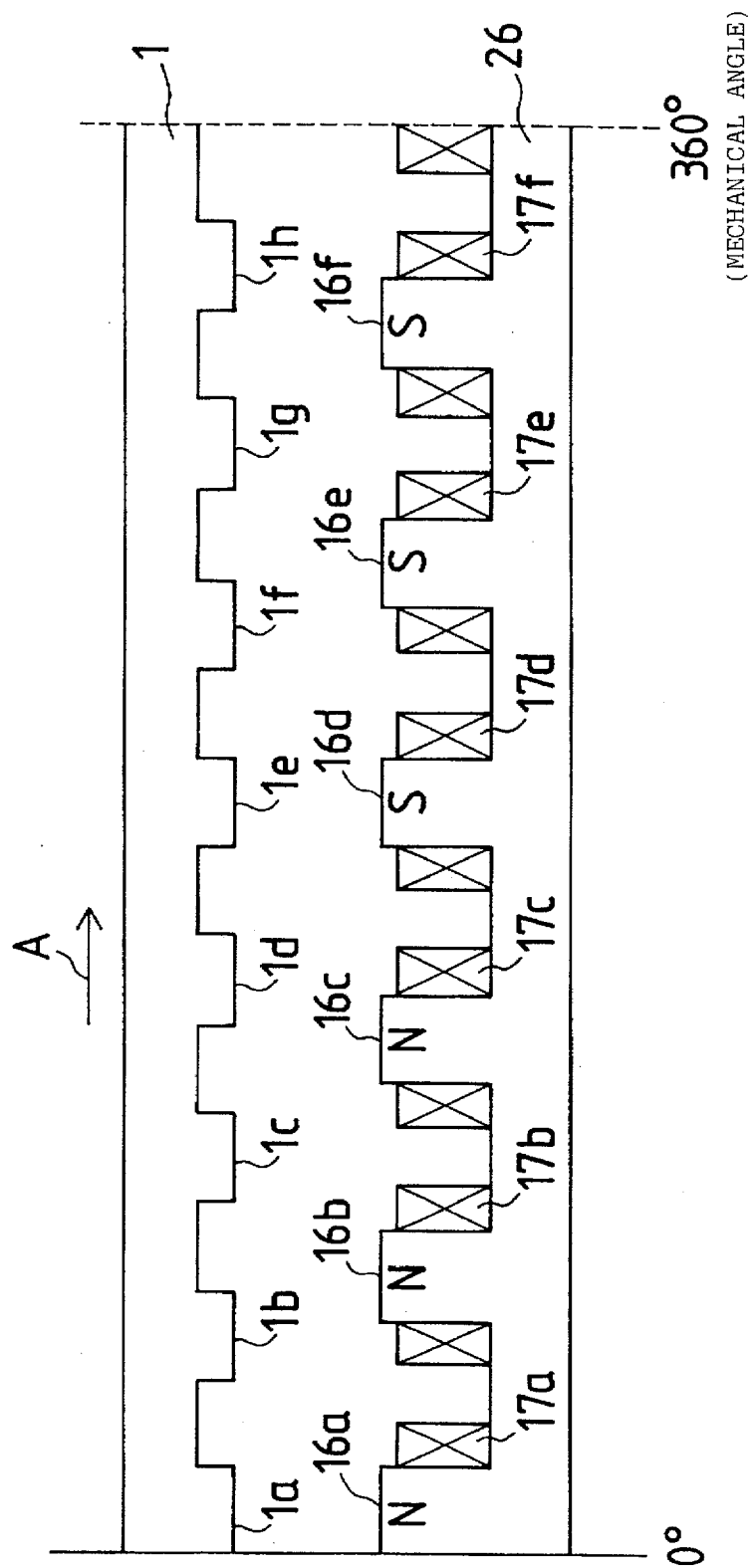
FIG. 4 is an expansion plan view of the armature and the rotor shown in FIG. 1.

The fixed armature 16 includes a circular ring portion 26 (yoke) and six magnetic poles 16a, 16b, 16c, 16d, 16e, and 16f protruding toward the center of the circular ring portion 26 as shown in FIG. 1. The magnetic poles 16a, 16b, 16c, ... have a width of 180 degrees each, and disposed at equal angular intervals in the circumferential direction. As described above, both the salient poles 1a, 1b, 1c, ... and the magnetic poles 16a, 16b, 16c, ... have an equal width of 180 degrees respectively. The armature 16 is also formed by the same means as that for the rotor 1. Each of the magnetic poles 16a, 16b, 16c, ... are wound with an armature coil 17a, 17b, 17c, ..., respectively. FIG. 4 is an expansion plan view of the magnetic poles 16a, 16b, 16c, ... and the rotor 1. The fixed armature 16 is fixed to a housing (not shown). The circular ring portion 26 of the fixed armature 16 is a magnetic core, forming a magnetic path.

The armature coils 17a and 17d are connected with each other in series or in parallel. This connected body is hereinafter called first phase armature coils. Likewise, the armature coils 17b and 17e are also connected with each other in series or in parallel. This connected body is hereinafter called second phase armature coils. Further, the armature coils 17c and 17f are connected with each other in series or in parallel, and this connected body is hereinafter called third phase armature coils.

When the second phase armature coils 17b and 17e are energized, the salient poles 1b and 1f are attracted to the magnetic poles 16b and 16e, respectively, so that the rotor 1 rotates in the direction of arrow A in FIG. 4. After the rotor 1 rotates 60 degrees, the second phase armature coils 17b and 17e are de-energized, and the third phase armature coils 17c and 17f are energized.

After the rotor 1 rotates 120 degrees, the third armature coils 17c and 17f are de-energized, and the first phase armature coils 17a and 17d are energized.

Thus, the energizing mode is alternated cyclically from the first phase armature coil to the second phase armature coil and to the third phase armature coil for each rotation of 120 degrees of the rotor 1. As a result, the electric motor of 3-phase one-sided wave is driven. In this case, the magnetic poles at positions symmetrical with respect to the axis (for example, the magnetic poles 16c and 16f) are energized so that one has N pole and the other has S pole as shown in FIG. 4. Since two magnetic poles energized simultaneously are always opposite poles, the leakage fluxes passing through the unenergized magnetic poles are in the direction opposite to each other, preventing the generation of negative torque.

Described next is a means for detecting the rotating positions of the salient poles 1a, 1b, 1c, ... and generating position detecting signals to control the energization of the first, second, and third phase armature coils 17a, 17b, 17c, ...

Figure 2:
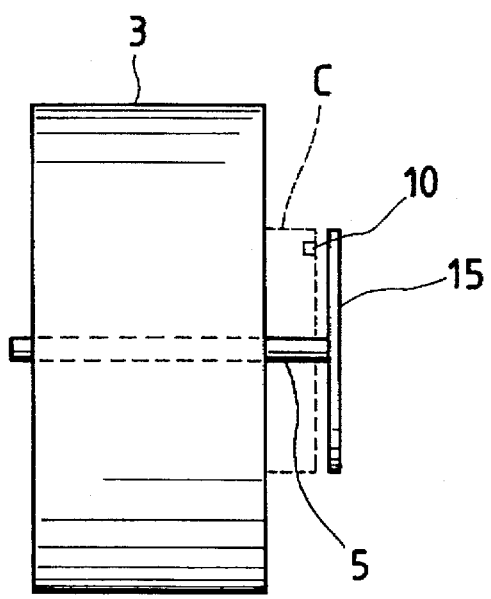
FIG. 2 is a side view of a position detecting apparatus in accordance with a first mode of the present invention.

FIG. 2 is a side view of a position detecting apparatus in accordance with a first mode of the present invention. Referring to FIG. 2, a cylindrical housing 3 has a fixed armature 16 therein, which is internally fixed to the housing 3 with its axis coinciding with the axis of the housing 3. The rotating shaft 5, rotating in synchronization with the rotor 1, passes through the housing 3 with the center of the rotating shaft 5 coinciding with the axis of the housing 3. A rotating disk 15 is fixed to the tip end of the rotating shaft 5 with its center coinciding with the axis of the rotating shaft.

Figure 3:
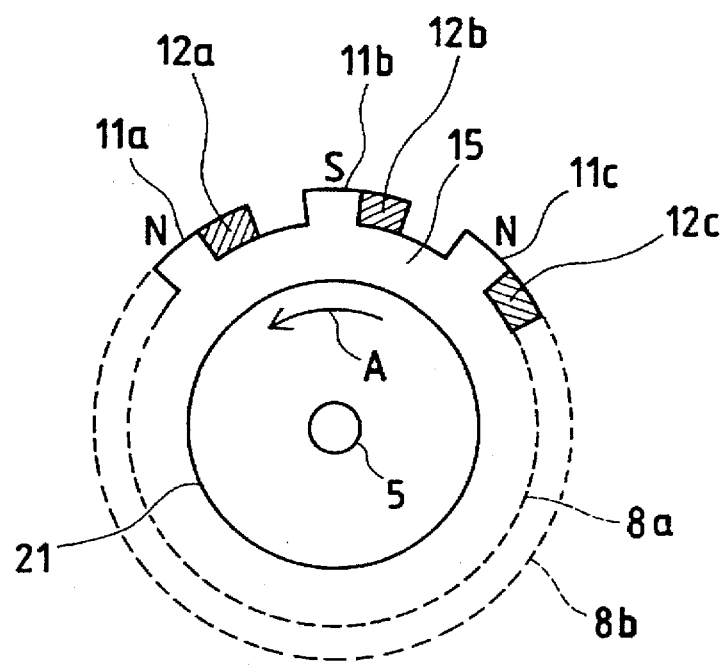
FIG. 3 is a front view of the position detecting apparatus shown in FIG. 2.

FIG. 3 is a plan view of the rotating disk 15. In FIG. 3, the rotating disk 15 is formed by fixing an annular member made of a metallic conductor such as aluminum on the outer peripheral surface or the outer peripheral side surface of a disk 21 made of plastics or the like. On the outer peripheral surface of the rotating disk 15, protrusions (first protrusions) with a 120-degree width 11a, 11b, 11c, ... are formed. Adjoining each of these first protrusions 11a, 11b, 11c, ... protrusions (second protrusions) 12a, 12b, 12c, ... are formed, respectively. The second protrusion also has a 120-degree width, but the surface thereof retracts from the first protrusion 11a, 11b, 11c, ... by a predetermined distance in the axial direction of the rotating shaft 5. In FIG. 3, the second protrusions 12a, 12b, 12c, ... are indicated by hatching.

The (void) portion where no protrusion is formed, disposed between the first protrusion 11a, 11b, 11c, ... having a width of 120 degrees and the second protrusion 12a, 12b, 12c, ... having a width of 120 degrees, also has a width of 120 degrees.

Both the number of first protrusions 11a, 11b, 11c, ... and the number of second protrusions 12a, 12b, 12c, ... are eight respectively. This number agrees with the number of the salient poles 1a, 1b, 1c, ... of the rotor 1 shown in FIG. 1. In FIG. 3, all of the eight first and second protrusions are not shown, some of protrusions omitted being represented by only the broken line circles 8a and 8b.

A small, flat coil is used as a position detecting element. This flat coil, denoted by reference numeral 10 in FIG. 2, is placed in a housing indicated by the broken line C. The coil face of the flat coil faces, via a given clearance, any of the first protrusions 11a, 11b, 11c, ..., the second protrusions 12a, 12b, 12c, ..., and the void portions between the first and second protrusions.

Figure 5:
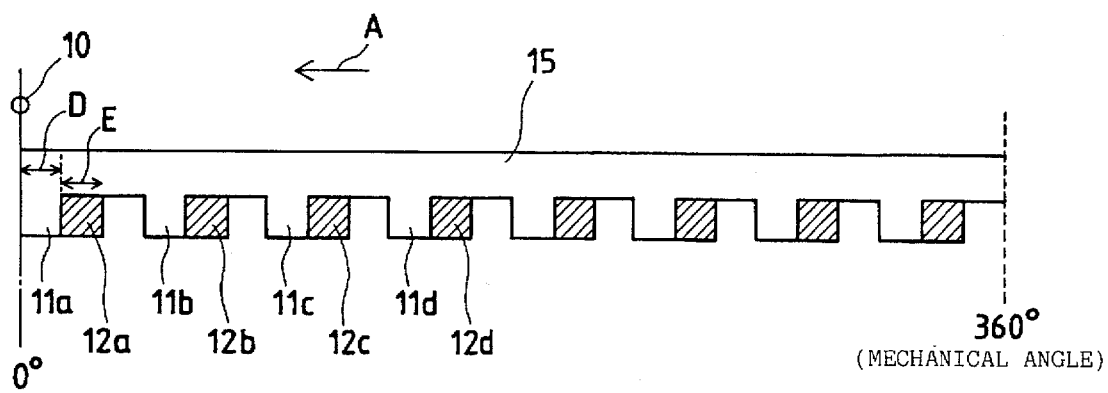
FIG. 5 is an expansion plan view of the position detecting apparatus in accordance with the first mode of the present invention.

FIG. 5 is an expansion plan view of the rotating disk 15 and the coil 10. In FIG. 5, the arrow A indicates the direction in which the rotating disk 15 rotates. This direction is the same as the direction of arrow A in FIG. 4 indicating the direction in which the rotor rotates. In FIG. 5, the width of the first protrusion 11a is indicated by the double-headed arrow D, and the width of the second protrusion 12a is indicated by the double-headed arrow E; each of the widths is 120 degrees. The width of the void portion where neither first nor second protrusion is formed is also 120 degrees.

Next, means for obtaining position detecting signals from the coil 10 will be described with reference to FIG. 7.

Figure 7:
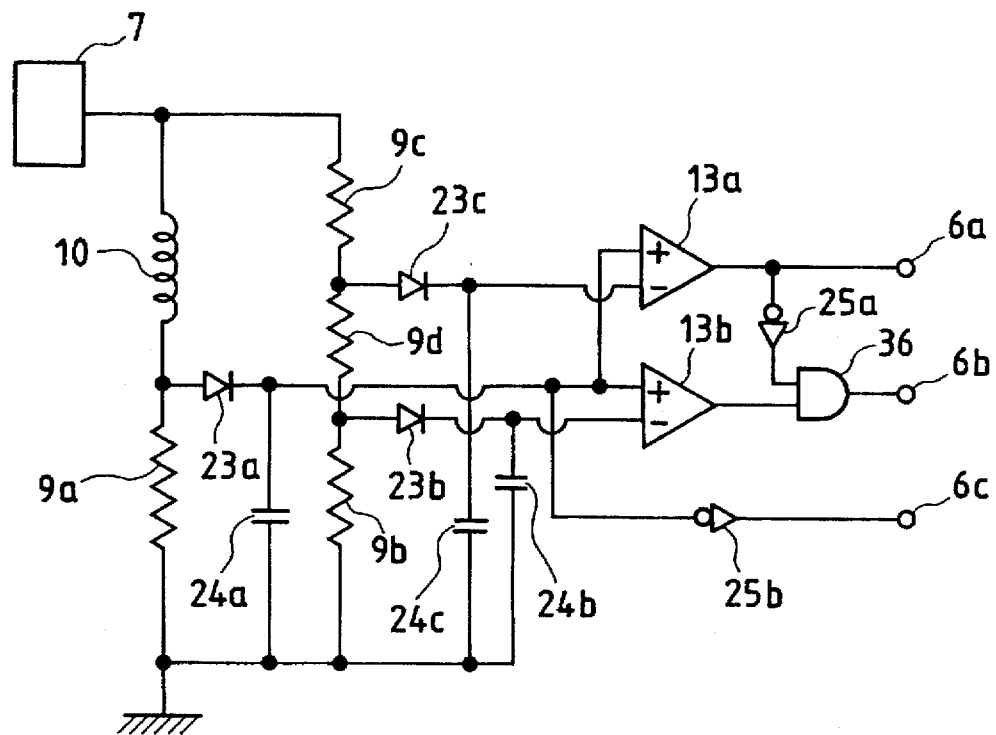
FIG. 7 is an electric circuit diagram of the position detecting apparatus shown in FIG. 5.

FIG. 7 shows an apparatus for obtaining 3-phase position detecting signals from the coil 10. This coil 10 is 5 mm in diameter, and has about 50 turns, having a hollow core. The coil 10, and resistors 9a, 9b, 9c, and 9d form a bridge circuit. This bridge circuit is adjusted so as to be balanced when the coil 10 does not face any of the first protrusions 11a, 11b, 11c, ... and the second protrusions 12a, 12b, 12c, ... of the rotating disk 15. In the balanced state, the output of a low path filter consisting of a diode 23a and a capacitor 24a is equal to the output of a low pass filter consisting of a diode 23b and a capacitor 24b. As a result, the output of an operational amplifier 13b becomes low level.

An oscillator denoted by numeral 7 oscillates at about 1 megacycle. When the coil 10 faces any of the first protrusions 11a, 11b, 11c, ... or the second protrusions 12a, 12b, 12c, ... of the rotating disk 15, impedance is decreased by iron loss (vortex loss and hysteresis loss), so that the voltage drop across the resistor 9a increases. As a result, the output of the operational amplifier 13b becomes high level.

The input to the plus and minus terminals of another operational amplifier 13a will be described below.

When the first protrusion 11a of the rotating disk 15 confronts the face of the coil 10, the impedance becomes the minimum. Next, when the second protrusion 12a confronts the face of the coil 10, the impedance becomes higher than the above minimum level. This is because the confronting space between the coil face and the second protrusion 12a becomes larger than the confronting space between the coil face and the first protrusion 11a. When the void portion, where neither the first protrusion nor the second protrusion is provided, confronts the face of the coil 10, the impedance increases further until reaching the maximum.

When the void portion of the rotating disk confronts the face of the coil 10, the input at the plus terminal of the operational amplifier 13b is equal to the input at the minus terminal as described above. Therefore, the output of the operational amplifier 13b becomes low level. In this case, the input at the minus terminal of the other operational amplifier increases corresponding to a voltage drop of the resistor 9d. Therefore, the output of the operational amplifier 13a becomes low level. Incidentally, a smoothing circuit is formed by a diode 23c and a capacitor 24c.

Figure 9:
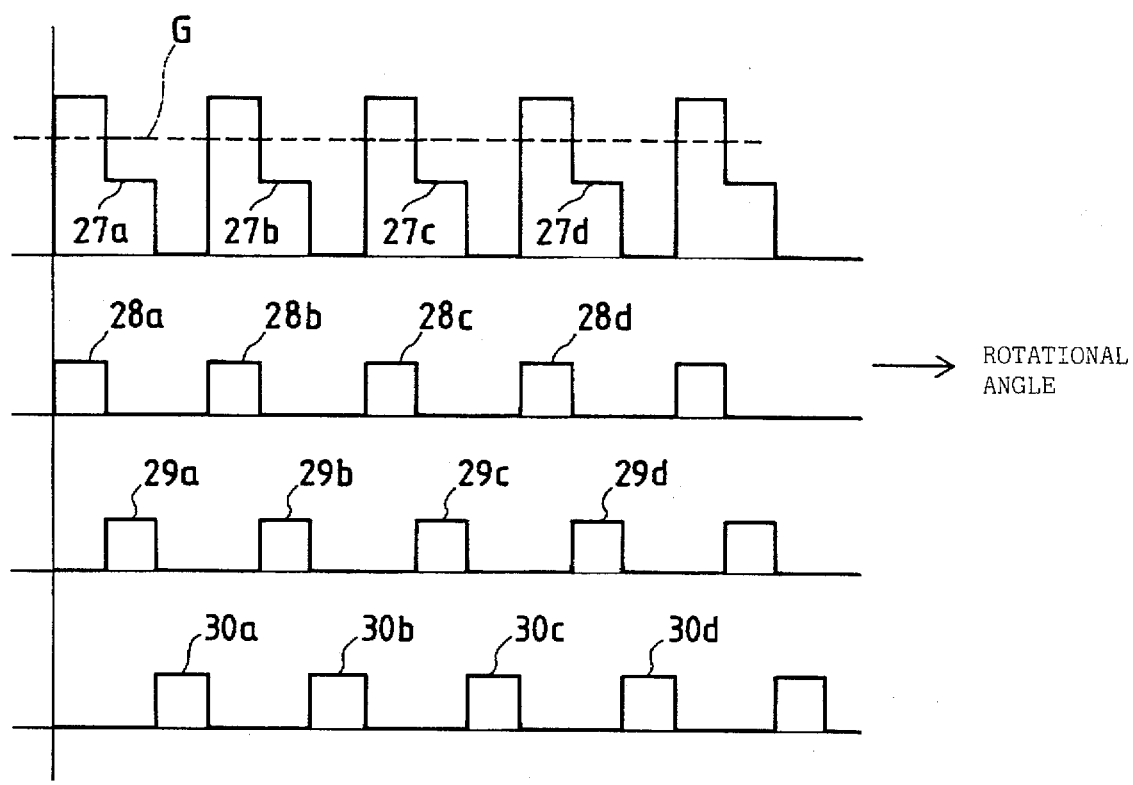
FIG. 9 is a graph of position detecting signals of the position detecting apparatus shown in FIG. 5.

When the first protrusion 11a and the second protrusion 12a of the rotating disk 15 successively confront the face of the coil 10, the output waveform of the operational amplifier 13b is shown by a curve 27a in the graph of FIG. 9. This curve 27a has a width of 240 degrees at the bottom and 120 degrees at the high portion indicated by the broken line G. Since the input to the minus terminal of the operational amplifier 13a increases corresponding to the voltage drop of the resistor 9d, the output of the operational amplifier 13a becomes the output of only the part above the broken line G in FIG. 9, where the face of the coil 10 confronts the first protrusion 11a of the rotating disk 15, as shown by a curve 28a in FIG. 9. The curve 28a has a width of 120 degrees.

The outputs of the operational amplifiers 13b and 13a in the case where the first protrusion 11a and the second protrusion 12a of the rotating disk 15 successively confront the face of the coil 10 has been described above. The outputs of the operational amplifiers 13a and 13b in the case where the first protrusion 11b and the second protrusion 12b successively confront the face of the coil 10, and where the first protrusion 11c and the second protrusion 12c successively confront the face of the coil 10, and so on are the same as the above-described case, as indicated by the curves 27b and 28b, 27c and 28c, ... in FIG. 9.

The output signal of the operational amplifier 13b (curve 27a, 27b, 27c, ...) has a width of 240 degrees, while the output signal of the operational amplifier 13a (curve 28a, 28b, 28c, ...) is inputted to an AND circuit 36 via an inverting circuit 25a, so that the output of the AND circuit 36 is indicated by a curve with a width of 120 degrees, that is, the curve 29a, 29b, 29c, ...

The input at the plus terminal of the operational amplifier 13b is inverted by an inverting circuit 25b. That is to say, only when there is no input at the plus terminal of the operational amplifier 13b, and the face of the coil 10 confronts the void portion of the rotating disk, where neither the first nor the second protrusion is formed, a high-level output is provided from the inverting circuit 25b.

As seen from the above description, the outputs from the terminals 6a, 6b, and 6c in FIG. 7 have waveforms of the curve 28a, 28b, 28c, ..., the curve 29a, 29b, 29c, ..., and the curve 30a, 30b, 30c, ... in FIG. 9, respectively. The outputs from the terminals 6a, 6b, and 6c have a width of 120 degrees and delay by 120 degrees from each other, so that, they become 3-phase position detecting signals.

In the above-described embodiment, 3-phase position detecting signal is provided by the combination of the rotating disk 15 formed with the first and second protrusions and the coil 10. Alternatively, a magnet rotor may be used in place of the rotating disk 15, and a Hall element may be used in place of the coil 10 to achieve the same object. This case will be described below as a second embodiment.

Figure 6:
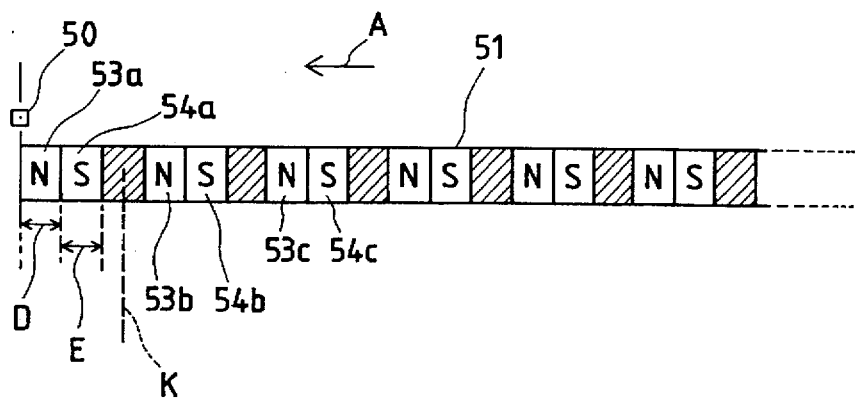
FIG. 6 is an expansion plan view of a position detecting apparatus in accordance with a second mode of the present invention.

An annular magnet is fixed to the outer peripheral surface or the outer peripheral side surface of the plastic disk 21 fixed to the rotating shaft 5 rotating in synchronization with the rotor 1 (refer to FIGS. 2 and 3). FIG. 6 is an expansion plan view of this magnet 51. In FIG. 6, the arrow A indicates the direction in which the magnet 51 rotates. On the magnet 51, an N pole with a width of 120 degrees, an S pole with a width of 120 degrees, and a non-magnetic-pole portion with a width of 120 degrees are repeated in the direction reverse to the direction of rotation indicated by arrow A. In FIG. 6, the N poles are denoted by 53a, 53b, 53c, ..., and the S poles are denoted by 54a, 54b, 54c, ..... The non-magnetic-pole portion is identified by hatching. The width of the N pole 53a is indicated by double-headed arrow D, and the width of the S pole indicated by double-headed arrow E. Each width is 120 degrees.

A Hall element 50 faces the N pole, the S pole, and the non-magnetic-pole portion in the named order as the magnet 51 rotates in the direction of arrow A, by which separate output signals are generated.

Figure 8:
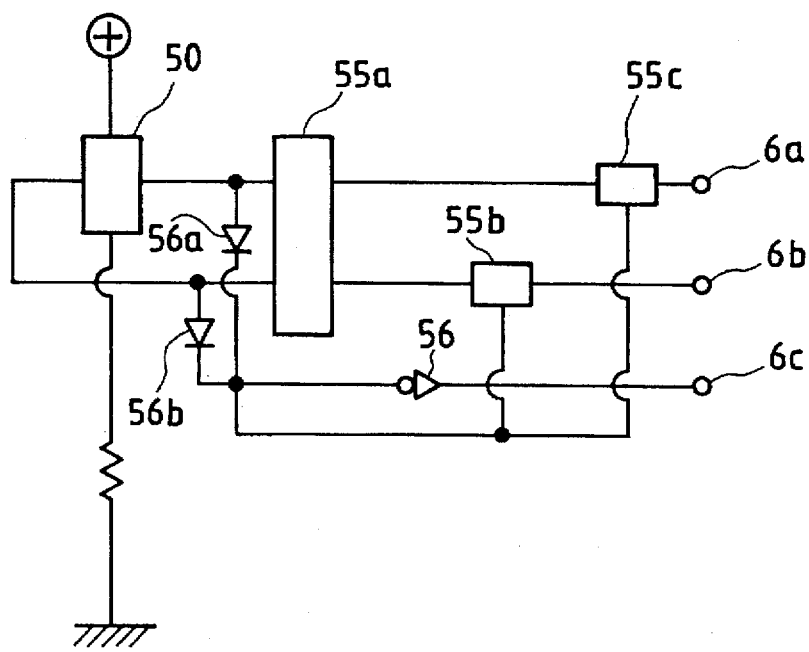
FIG. 8 is an electric circuit diagram of the position detecting apparatus shown in FIG. 6.

FIG. 8 shows a circuit for processing the output signal of the Hall element 50. In FIG. 8, the signals of two kinds outputted when the Hall element 50 faces the N pole and the S pole are amplified by an amplifying circuit (not shown) and inputted to a flip-flop circuit 55a (hereinafter called FF circuit). One of the two outputs from the FF circuit 55a is sent to a terminal 6a via a transistor circuit 55c, while the other output is sent to a terminal 6b via a transistor circuit 55c. Two outputs from the Hall element 50 are inputted to an inverting circuit 56 via diodes 56a and 56b, and the output from the inverting circuit 56 is sent to a terminal 6c. The outputs from the diodes 56a and 56b serve as the control input for the transistor circuits 55b and 55c.

When the Hall element 50 faces the N pole 53a, 53b, 53c, ... of the magnet 51, a position detecting signal of a 120-degree width, the same as the width of the magnetic pole, can be obtained from the terminal 6a by a first output (upper output in FIG. 8) of the FF circuit 55a. Next, the Hall element 50 faces the S pole, a position detecting signal of a 120-degree width can be obtained from the terminal 6b by a second output (lower output in FIG. 8) of the FF circuit 55a. When the output is obtained from either of the terminal 6a or 6b, the input to the inverting circuit 56 via the diode 56a or 56b is at high level, so that the output of terminal 6c is at low level.

When the Hall element 50 faces the non-magnetic-pole portion (hatched portion in FIG. 6) having a width of 120 degrees, the output of the Hall element 50 disappears, so that the two inputs to the FF circuit 55a become low level. One of the outputs from the FF circuit 55a is kept at high level. However, since the output of the Hall element 50 disappears, the signals entering the transistor circuits 55b and 55c as a control input via the diodes 56a and 56b also become low level, and the transistor circuits 55b and 55c are made nonconductive. As a result, the outputs from the terminals 6a and 6b become low level, and the output from the terminal 6c is at high level.

If the Hall element 50 faces the non-magnetic-pole portion when the power source is turned on, either one of the outputs from the FF circuit 55a is available, but the outputs through the diodes 56a and 56b are at low level at this time, so that there is no control input to the transistor circuits 55b and 55c. Therefore, the transistor circuits 55b and 55c are kept nonconductive. As a result, the outputs from the terminals 6a and 6b are at low level.

Two outputs from the Hall element 50 are amplified and serve as the inputs to the diodes 56a and 56b. A capacitor (not shown) of small capacity prevents the voltage at the boundary of the outputs from the diodes 56a and 56b from becoming a zero value.

As seen from the above description, position detecting signals of a 120-degree wide rectangular wave can be obtained from the terminals 6a, 6b, and 6c as the Hall element 50 faces the N pole, the S pole, and the non-magnetic-pole portion in sequence as shown in FIG. 6.

Figure 10:
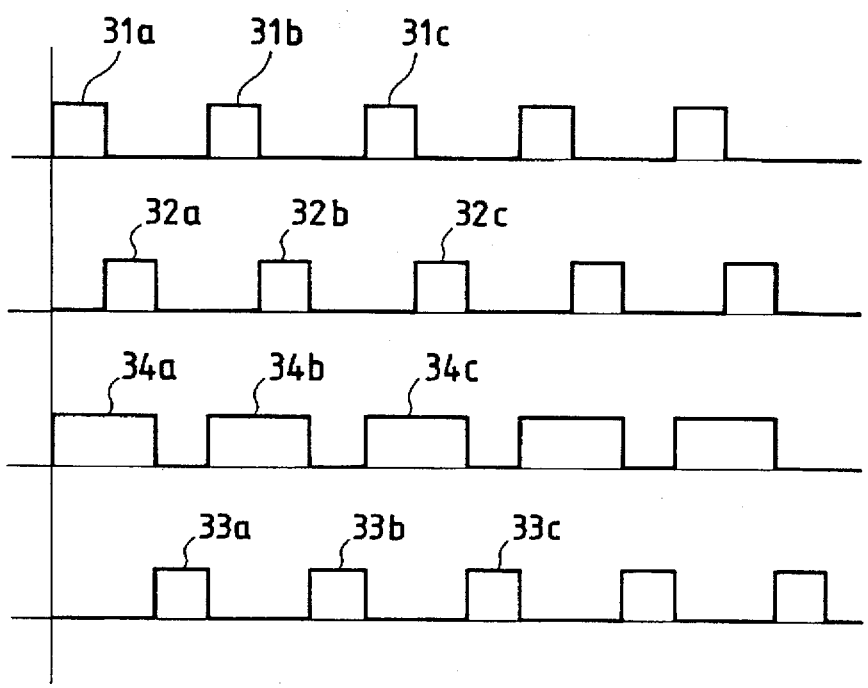
FIG. 10 is a graph of position detecting signals of the position detecting apparatus shown in FIG. 6.

The signals at the terminals 6a, 6b, and 6c in FIG. 8 are graphically shown by the curves 31a, 31b, 31c, . . . , the curves 32a, 32b, 32c, . . . , and the curves 33a, 33b, 33c, . . . , respectively in FIG. 10.

As seen from the above description, when the magnet in FIG. 6 rotates in synchronization with the rotor of the motor, three sets of position detecting signals having a width of 120 degrees can be obtained from the terminals 6a, 6b, and 6c. The 120-degree wide position detecting signals of the first, second, and third phases are continuous with each other without any gap. Therefore, an electric motor which can start stably and reliably is obtained. This invention can also be used as a position detecting apparatus for a half-wave DC motor having a 3-phase magnet rotor.

I claim:

1. An apparatus for obtaining 3-phase position detecting signals by using a single position detecting element, in which
    a circumference of a rotating disk for a 3-phase electric motor, which is to be controlled by detecting a position of a rotor while being rotated synchronously with said rotor, is divided into sections where a number of sections is equal to a number of salient poles of said rotor;
    each section of said rotating disk is divided into three subsections, a first, second, and third subsections, each having an equal width in the circumferential direction, and said divided subsections have physical properties or constructions differing from each other;
    one position detecting element is fixed to the motor body at a position facing the outer peripheral portion of said rotating disk; and
    when said position detecting element faces said first, second, and third subsections on said rotating disk in sequence as said rotating disk rotates, the change in electromagnetic action created between each subsection and said position detecting element is processed via an electric circuit, and taken out as position detecting signals of first, second, and third phases, which have a width of an electrical angle of 120 degrees respectively and are continuous with each other without gap.

2. An apparatus for obtaining 3-phase position detecting signals by using a single position detecting element, comprising a conductor disk, which is to rotate in synchronization with an electric motor, has a plurality of protrusions with a width of an electrical angle of 240 degrees and is disposed on the circumferential surface apart from each other by an electrical angle of 120 degrees; and a coil constituting one position detecting element is fixed to the motor body so that the coil face confronts the rotating surface of said protrusion of said conductor disk via a small clearance, wherein
    each protrusion of said conductor disk is divided into two sections, first and second sections, each having a width of 120 degrees in electric angle so that the clearance between the surface of the protrusion and confronting surface of the coil becomes different between the two section within each protrusion; and
    an electric circuit is provided in which when a section where said protrusions are not formed on said conductor disk is treated as a third section, the difference in impedance arising when the face of said coil confronts first, second, and third sections of said protrusion respectively, as said conductor disk rotates, is detected by the change in current value of a high-frequency alternate current applied to said coil, by which position detecting signals of first, second and third phases corresponding the first, second, and third sections of said protrusion are taken out.

3. An apparatus for obtaining 3-phase position detecting signals by using a single position detecting element, in which
    magnets having a width of an electrical angle of 120 degrees are disposed on the circumferential surface of a disk rotating in synchronously with an electric motor in a manner such that adjacent two magnets are apart from each other by an electrical angle of 120 degrees, and the adjacent magnetic poles of said magnets are arranged to have opposite polarities to form a magnetic rotor, the rotating disk being divided into a plurality of sections where a number of sections equals a number of salient poles of magnetic rotor and each section being divided into three subsections;
    a Hall element, which is a position detecting element, is fixed to the motor body so as to face the N and S magnetic pole faces of said magnet rotor via a slight clearance;
    when one of the N and S magnetic poles faces said Hall element as said magnet rotor rotates, a first position detecting signal with a width of an electrical angle of 120 degrees is outputted, subsequently when the other of the N and S magnetic poles faces said Hall element, a second position detecting signal with a width of an electrical angle of 120 degrees is outputted, and subsequently when a section on said magnet rotor, having no magnetic pole, faces said Hall element, a third position detecting signal with a width of an electrical angle of 120 degrees is detected.

* * * * *